United States Patent

[11] 3,568,777

[72] Inventor Richard Wayne Hook
 Des Moines, Iowa
[21] Appl. No. 763,693
[22] Filed Sept. 30, 1968
[45] Patented Mar. 9, 1971
[73] Assignee Deere & Company
 Moline, Ill.

[54] IMPLEMENT FRAME CONSTRUCTION
 11 Claims, 5 Drawing Figs.
[52] U.S. Cl.................................................. 172/316,
 172/311, 172/456, 172/491, 280/413
[51] Int. Cl....................................................... A01b 63/10
[50] Field of Search.......................................... 172/456,
 311, 130, 315, 491; 280/413

[56] References Cited
 UNITED STATES PATENTS
 2,871,028 1/1959 Hibbard ........................ (172/311UX)

3,186,494 6/1965 Jackson........................ 172/456X

Primary Examiner—Robert E. Bagwill
Assistant Examiner—Alan E. Kopecki
Attorneys—H. Vincent Harsha, Harold M. Knoth, William A. Murray and John M. Nolan ABSTRACT: An implement having a main frame and outrigger frames connected to the main frame by hinge members which normally prevent the outrigger frames from moving into the same plane as the main frame. A double-acting hydraulic cylinder is operably connected between the frames at a rearward portion thereof to raise and lower the outrigger frames and to force the outrigger frames into substantially the same plane as the main frame. When the hydraulic cylinder forces the outrigger frames into the plane of the main frame, it sets up a moment which counteracts the field load moment caused by earth-working tools suspended from the frames and reduces hinge stress.

PATENTED MAR 9 1971 3,568,777
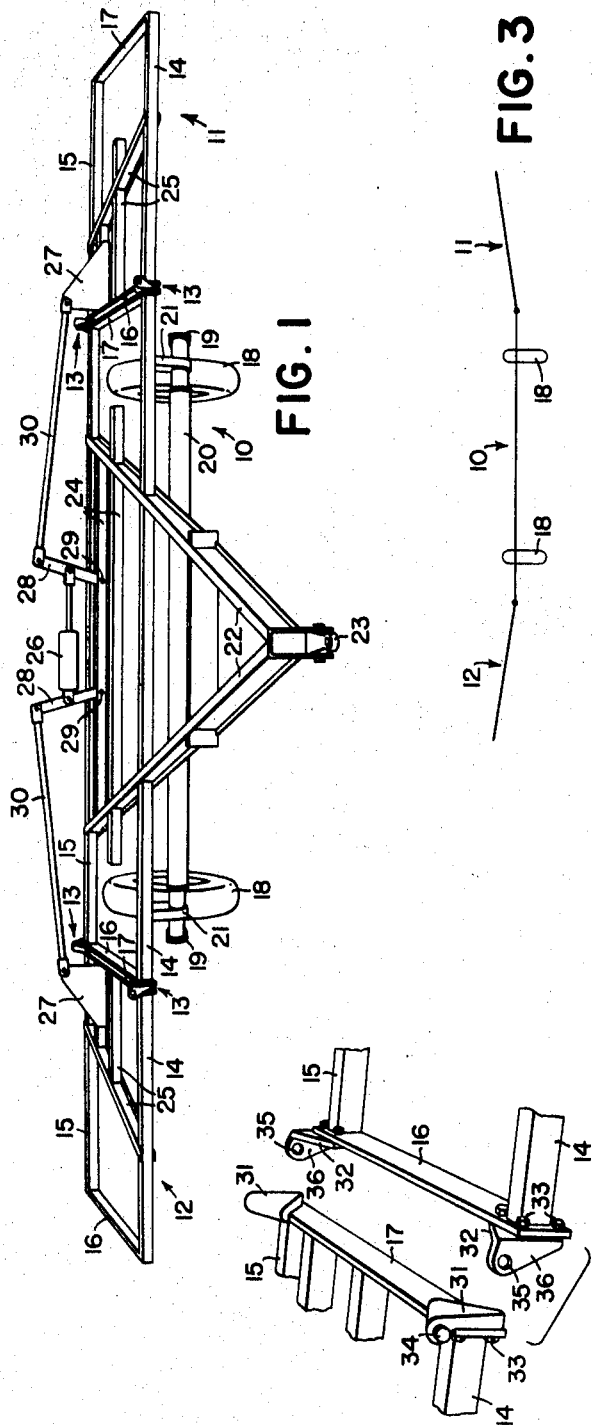
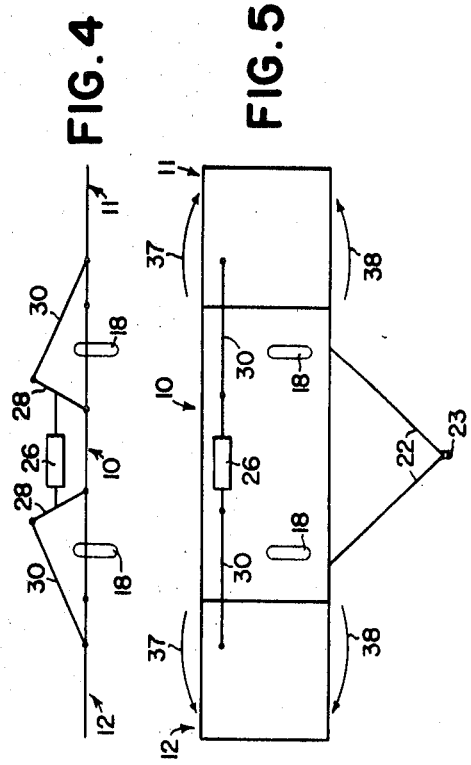
INVENTOR.
R. W. HOOK 3,568,777

IMPLEMENT FRAME CONSTRUCTION

BACKGROUND OF THE INVENTION

The present invention relates generally to implement frames for carrying earth-working tools and more particularly to multiple-section implement frames in which outrigger sections are pivotally connected to the main section and are movable between working and transport positions in which they extend substantially horizontally and vertically, respectively.

In order to provide convenient transportation of wide implements such as chisel plows and the like, it has become customary to provide a transverse series of implement frame sections pivotally secured together so that the outer or outrigger sections could be moved from their normal horizontal working position to a vertical transport position to thereby reduce the width of the implement. In all such implements, the outrigger frames could be moved to their horizontal position by the influence of gravity alone, and once they reach their horizontal position, further downward movement of the outrigger frames was prevented by gauge wheels or by having the two pieces of the hinge members abut so that the outrigger sections were suspended in their horizontal position in cantilever fashion. Examples of these implement frames are illustrated in U.S. Pats. 3,321,028 issued to M. A. Groenke on 23 May 1967 and 3,255,830 issued to M. A. Groenke on 14 Jun. 1966.

While the implement frames disclosed in the above-mentioned patents were satisfactory in the sense that the outrigger frame sections could be moved to a transport position, they have had their disadvantages in that the hinges between the frame sections presented structurally weak points in the implement and the hinges would often fail under the stress caused by field load moments on the outrigger frames.

SUMMARY OF THE INVENTION

According to the present invention, the frame sections of a multiple-section implement are joined together by hinges which normally hold the outrigger sections a few degrees inclined from the horizontal position. A raising and lowering mechanism is operative to force the outrigger frames down to the horizontal position by stressing and deflecting the various frame components. By mounting the raising and lowering mechanism to the rear of the frame sections, a moment will be set up on the outrigger frames when they are forced into their horizontal position, and this moment will be in a direction opposed to the field load moments so that the hinge stress caused by field load moments is reduced.

It is therefore the principal object of the present invention to provide an improved multiple-section implement frame of the type having outrigger frame sections hinged to the transverse sides of a main frame section for pivotal movement between working and transport positions in which the hinge stress caused by field load moments will be reduced by a counter moment created by the raising and lowering mechanism for the outrigger frame sections.

The above object and additional objects and advantages of the present invention will become apparent along with the details of construction of a preferred embodiment of the invention from a reading of the following detailed description when taken in conjunction with the accompanying drawing.

BRIEF DESCRIPTION OF THE DRAWING

In the drawing:

FIG. 1 is a perspective view of a multisection implement frame embodying the principles of the present invention;

FIG. 2 is an enlarged perspective view of the hinge connections between the outrigger and main frame sections;

FIG. 3 is a diagrammatic front elevational view of the implement frame illustrated in FIG. 1 and illustrating the position which the outrigger frame sections will assume under the influence of gravity alone;

FIG. 4 is a view similar to FIG. 3 but illustrating the position of the outrigger frame sections when moved to their working position by the lift and lowering mechanism; and FIG. 5 is a diagrammatic plan view of the multiple-section implement frame illustrated in FIG. 1 and showing the various moments acting on the outrigger frames during use.

DESCRIPTION OF THE PREFERRED EMBODIMENT

Referring to the drawing, the implement frame according to the present invention consists of a main frame section indicated generally at 10 and outrigger sections indicated generally at 11 and 12 which are pivotally secured to the sides of the main frame section by hinges indicated generally at 13. Each of the frame sections includes transversely extending frame members 14 and 15 which are interconnected by fore-and-aft extending frame members 16 and 17. The main frame section 10 is supported on ground-engaging wheels 18 which are carried by crank arms 19 secured to the ends of a rockshaft 20. The rockshaft 20 is mounted on the main frame section 10 by brackets 21 depending from the frame member 14. The wheels 18 can be raised and lowered relative to the frame by rotation of the rockshaft 20 in any well-known conventional manner. The main frame section 10 is also provided with a pair of draft members 22 which converge forwardly to an apex where they are provided with an apertured hitch member 23 which is adapted to be attached to a propelling vehicle. The main frame section 10 is also provided with a plurality of intermediate transversely extending frame members 24 and the outrigger frame sections are provided with a plurality of intermediate frame members 25. The frame members 14—17, 24 and 25 will normally carry a plurality of earth-working tools such as chisel plows which, for simplicity, are not illustrated.

The outrigger frame sections 11 and 12 can be raised and lowered about the hinges 13 by an extensible and retractable double-acting hydraulic cylinder 26. To this end, each of the outrigger frame sections is provided with an upstanding bracket 27 which is secured to one of the intermediate frame members 25, and a pair of arms 28 which are pivotally mounted on the main frame section 10 as at 29 are interconnected with the brackets 27 by rigid links 30. The links 30 are pivotally attached to the upper ends of the respective brackets 27 and also to the free ends of the respective arms 28. The hydraulic cylinder 26 extends between the arms 28 and is pivotally secured thereto intermediate the ends thereof. The cylinder 26 will be interconnected with the conventional fluid pressure source and fluid reservoir on the propelling vehicle so that it may be extended and retracted by operator manipulation of the conventional hydraulic controls provided on the propelling vehicle. By retracting the cylinder 26, the arms 28 are drawn together so that the upper ends of the brackets 27 are drawn towards the center of the main frame section 10 by the links 30 to move the outrigger frame sections 11 and 12 about the hinges 13 to a vertical transport position. By extending the cylinder 26, the outrigger frame sections 11 and 12 are pivoted about the hinges 13 to a horizontal working position as illustrated in FIG. 1.

As illustrated in FIG. 2, each of the hinges 13 consists essentially of two plates 31 and 32 which are secured to the respective frame members 16 and 17 in any suitable manner such as bolts and nuts 33. Each hinge plate 31 is provided with a stub shaft 34 which extends through and is journaled in an aperture 35 provided in an outstanding ear 36 on the corresponding hinge plate 32. The hinge plates 31 are generally of wedge shape and diverge away from the stub shaft 34 so that when the inner faces of the hinge plates 31 and 32 are in abutting relationship, the outer faces thereof extend at an acute angle with respect to each other. With the hinges 13 so constructed, the outrigger frame sections 11 and 12 would lie in planes inclined upwardly from the plane of the main frame section 10 if they were lowered only under the influence of gravity. The relationship of the outrigger frame sections 11 and 12 with respect to the main frame section 10 when lowered only under the influence of gravity is illustrated in FIG. 3. However, by extending the hydraulic cylinder 26, the various frame members will be stressed and deflected so that the outrigger frame sections 11 and 12 will move into a position coplanar with the main frame section 10 as illustrated in FIG. 4. The force exerted by the hydraulic cylinder 26 on the outrigger frame sections 11 and 12 will have a horizontal component as well as a vertical component, and, due to the fact that the hydraulic cylinder 26 and upstanding brackets 27 are mounted on the frame sections to the rear of the transverse center line of the frame, the horizontal force will create a moment on the outrigger frame sections 11 and 12. The moment on the outrigger frame sections 11 and 12 created by the hydraulic cylinder 26 will be in a direction indicated by the arrows 37 in FIG. 5.

When the implement is in use, the resistance of earth-working tools mounted on the outrigger frames 11 and 12 to movement through the ground will set up field load moments on the frame sections 11 and 12 which will be in the direction indicated by the arrows 38 in FIG. 5. Generally, the field load moments on the outrigger frame sections 11 and 12 would create sufficient stress on the hinges 13 to cause their failure. However, the moments on the outrigger frame sections 11 and 12 caused by the hydraulic cylinder 26 will counteract the field load moments and greatly reduce the hinge stress during use.

I claim:

1. An implement frame adapted to be moved forwardly over the ground comprising: first and second frame sections; means pivotally connecting said frame sections together in side-by-side relationship for movement of one of said frame sections about the other; said means including stop means preventing said frame sections from pivotally moving into transverse alignment; and power means connected between said frame sections operative to force said frame sections into substantially transverse alignment by deflection of said frame sections and simultaneously provide a forward moment on one of the frame sections.

2. The implement frame as set forth in claim 1 wherein said frame sections are substantially planar and said power means is mounted on and connected between said frame sections on rearward portions thereof.

3. The implement frame as set forth in claim 2 wherein said power means includes: an upstanding bracket on one of said frame sections; an arm pivotally mounted at one end on the other of said frame sections; a rigid link means having its ends connected to the upper end of said bracket and the free end of said arm; and an extensible and retractable double acting hydraulic cylinder operably connected between said other frame section and said arm to pivotally move the free end of said arm toward and away from the pivotal connection between said frame sections.

4. The implement frame as set forth in claim 3 wherein said means pivotally connecting said frame sections and said stop means comprise: a first hinge plate having an outer face secured to one side of one of said frame sections, a second hinge plate having an outer face secured to one side of the other frame section, said hinge plates being pivotally connected together above said frame sections; one of said hinge plates being substantially wedge shaped and diverging away from the pivotal connection; whereby, when the inner faces of said hinge plates are in abutting relation, the outer faces of said hinge plates will lie in planes extending at an angle to each other.

5. An implement frame adapted to be moved forwardly over the ground comprising: a transverse series of frame sections including a main frame section and outrigger frame sections; means on the forward end of said main frame section for attachment with a propelling vehicle; means pivotally connecting said outrigger frame sections to said main frame section for vertical pivotal movement of said outrigger frame sections about said main frame section; said last mentioned means including stop means preventing said outrigger frame sections from pivotally moving into alignment with said main frame section; and power means operably connected between said frame sections to pivotally move said outrigger frame sections about said main frame sections to pivotally move said outrigger frame sections about said main frame section and to force said outrigger frame sections into alignment with said main frame section while simultaneously producing a forward moment on the outrigger frame sections.

6. The implement frame set forth in claim 5 wherein each of said frame sections is substantially planer and has front, rear and side edges, and said power means is mounted on and connected between the upper surfaces of said frame sections adjacent the rear edges thereof.

7. The implement frames as set forth in claim 6 wherein said power means includes: an upstanding bracket mounted on each of said outrigger frame sections; a pair of arms pivotally mounted on said main frame section in spaced apart positions; rigid link means extending between each of said upstanding brackets and one of said arms; and extensible and retractable double acting hydraulic cylinder means operably connected to said arms to pivotally move said arms about their mounting on said main frame section; whereby, by extension and retraction of said hydraulic cylinder means, said outrigger frame sections may be pivotally moved about said main frame section and forced into alignment with said main frame section.

8. The implement frame as set forth in claim 7 wherein there is a single hydraulic cylinder means having its opposite ends connected to said arms, whereby the movements of said outrigger frame sections can be controlled with a single hydraulic cylinder means.

9. The implement frame as set forth in claim 6 wherein said means pivotally connecting said outrigger frame sections to said main frame section and said stop means comprise: hinge means between each outrigger frame section and the main frame section; each hinge means having first and second hinge plates secured to the adjacent side edges of the main and outrigger frame sections, respectively, and pivotally connected together above said frame sections; and one of said hinge plates being of wedge shape and diverging away from the pivotal connection.

10. A transversely elongated implement frame adapted to support a plurality of earth-working tools and be moved forwardly over the ground, means on the frame for connection with a propelling vehicle, the frame having a central portion and transversely spaced opposite outer portions, and stressing means attached to the frame and prestressing the frame to provide a forward moment on the outer portions of the frame which counteract stresses placed on the frame by field loads.

11. An implement frame adapted to be moved forwardly over the ground comprising: a transverse series of frame sections including a main section and outrigger sections adapted to carry a plurality of earth-working tools; means on the main section for connection with a propelling vehicle; means connecting the outrigger sections to the main section; and stressing means attached to the sections prestressing the connecting means to provide a forward moment on each of the outrigger sections which counteract stresses placed on the frame by field loads.